United States Patent [19]

Yamada

[11] Patent Number: 4,831,580
[45] Date of Patent: May 16, 1989

[54] PROGRAM GENERATOR

[75] Inventor: Yoshikiyo Yamada, Tokyo, Japan

[73] Assignee: Nippon Electric Industry Co., Ltd., Tokyo, Japan

[21] Appl. No.: 884,112

[22] Filed: Jul. 10, 1986

[30] Foreign Application Priority Data

| Jul. 12, 1985 | [JP] | Japan | 60-153668 |
| Oct. 16, 1985 | [JP] | Japan | 60-230528 |
| Oct. 16, 1985 | [JP] | Japan | 60-230529 |
| Oct. 16, 1985 | [JP] | Japan | 60-158487[U] |
| Oct. 17, 1985 | [JP] | Japan | 60-159011[U] |
| Oct. 17, 1985 | [JP] | Japan | 60-159012[U] |

[51] Int. Cl.⁴ .................... G06F 3/00; G06F 3/14
[52] U.S. Cl. ............................ 364/900; 364/300
[58] Field of Search ................ 364/300, 900 MS File

[56] References Cited

U.S. PATENT DOCUMENTS

| 3,898,438 | 8/1975 | Nater et al. | 364/300 |
| 4,058,849 | 11/1977 | Fitzgerald et al. | 364/520 |
| 4,455,619 | 6/1984 | Masui et al. | 364/900 |
| 4,536,840 | 8/1985 | Borta | 364/300 |
| 4,613,946 | 9/1986 | Forman | 364/518 |
| 4,683,549 | 7/1987 | Takai | 364/900 |

Primary Examiner—Thomas M. Heckler
Assistant Examiner—Joseph T. Fitzgerald
Attorney, Agent, or Firm—Jordan and Hamburg

[57] ABSTRACT

A program generator automatically generates a program based on a flow-chart of a series of sequence control processes. The flow-chart is prepared while being displayed on the display area of a display means such as CRT, and when the flow-chart is complete, a program is automatically generated corresponding to the flow-chart.

4 Claims, 20 Drawing Sheets

FIG.13

(1) Basic Instructions

| Instruction | Symbol | Mnemonic | Operand | Function |
|---|---|---|---|---|
| CONDITIONAL WAIT | CJ (YES/NO) | CJ | [NOT] Relay No. or[NOT] < >= or[NOT] R | Keeps waiting until the decision condition is satisfied (R indicates the result of logical operation.) |
| CONDITIONAL BRANCH | CJ* (YES/NO) | CJ | [NOT] Relay No. or[NOT] < >= or[NOT] R ---------------- Label No.0~999 | Causes a jump to the specified label when the decision condition is satisfied. (R indicates the result of logical operation.) |
| TIMER WAIT | TIM (UP/NO) | TIM | Timer No.(0-127) ---------------- Timer setting value (0~9999) or(M0-M510) or(U0-UF7F) | Sets the timer and awaits timer-up. (The minimum timer unit is 0.1 sec.) |
| TIMER BRANCH | TIM* (UP/NO) | TIM | Timer No.(0-127) ---------------- Timer setting value (0~9999) or(M0-M510) or(U0-UF7F) ---------------- Label No.0~999 | Starts operation after setting the timer to a desired point. If set time on the timer lapses, it causes a jump to the specified label. When already in operation, it performs decision processing for time-up. (The minimum timer unit is 0.1 sec.) |
| COUNTER WAIT | CNT (UP/NO) | CNT | Counter No.(0-31) ---------------- Counter setting value (0-9999) or(M0-M510) or(U0-UF7F) ---------------- Input relay No. | Waits counter count-up after setting the counter. |
| COUNTER BRANCH | CNT* (UP/NO) | CNT | Counter No.(0-31) ---------------- Counter setting value. (0-9999) or(M0-M510) or(U0-UF7F) ---------------- Input relay No. ---------------- Label No.0~999 | Causes a jump to the specified label when the counter does not count-up after setting. When the counter has been already set, it performs decision processing for COUNTUP. |
| OUTPUT | OUT | OUT | [NOT] Relay No. ---------------- (Simultaneous specification for up to 4 pcs.) | Turns ON/OFF the output relay. When continuous specification code(~) is inserted between each relay No. relays between these relay numbers are all turned ON or OFF. |
| JUMP SOURCE SPECIFICATION | JUMP *n | JUMP | Label No.0~999 | Causes an unconditional jump to the specified label destination. |
| JUMP DESTINATION SPECIFICATION | n FROM | FROM | Label No.0~999 | Specifies the terminal indication of a jump destination. The specified jump destination is graphically displayed. At this time, the graphic address of jump source is written automatically. |
| SHIFT REGISTER | SR | SR | Input relay No. ---------------- Shift head relay No. ---------------- Shift end relay No. | The data from the shift head relay No. to the shift end relay No. are shifted by one bit to the end relay side, and the input relay data are input in the end relay. |

FIG. 14

(2) Bit Processing Application Instructions (Logical Operation Instructions)

| Instruction | Symbol | Mnemonic | Operand | Function |
|---|---|---|---|---|
| AND OPERATION | ⊣[AND]⊢ | AND | [NOT] Relay No. (Simultaneous specification for up to 4 relays) | Performs AND of 2 or more bits, in combination with CJ (waiting and branch). One instruction permits up to 4 bits to be treated. Used in combination with AND instruction without operand, permits operation of n-bits. |
| OR OPERATION | ⊣[OR]⊢ | OR | [NOT] Relay No. (Simultaneous specification for 4 relays) | Performs OR operation of 2 bits or more, in combination with CJ (waiting and branch) instructions. One instruction permits up to 4 bits to be treated. Used in combination with OR instruction without operand, permits operation of n-bits. |
| DIFFERENTIATION SPECIFICATION | ⊣[DIF]⊢ | DIF | [NOT] Relay No. | Specifies differential processing of input bit data, in combination with CJ (waiting and branch) instructions. |

FIG. 15

(3) Group Subroutine Instructions

| Instruction | Symbol | Mnemonic | Operand | Function |
|---|---|---|---|---|
| GROUP DEFINITION | (GN) | GN | Group program No. (0~31) | Indicates head of group program. |
| GROUP START | ⊣[GS]⊢ | GS | Group program No. (0~31) | Starts another group program. When the program is temporarily halted by GP instruction, restarts the group program. |
| GROUP HALT | ⊣[GH]⊢ | GH | Group program No. (0~31) | Halts and initializes other group program. When being called, the subroutine is also initialized. |
| GROUP END | (GE) | GE | | Indicates end of group program. |
| GROUP TEMPORARY STOP | ⊣[GP]⊢ | GP | Group program No. (0~31) | Temporarily stops other active group program. However, cannot stop timer. (The Program is restarted by GS instruction). |
| SUBROUTINE DEFINITION | (SBN) | SBN | Subroutine No. (0~255) | Indicates head of subroutine program. |
| RETURN | (RET) | RET | | Indicates end of subroutine program. |
| CALL | ⊣[CALL]⊢ | CALL | Subroutine No. (0~255) | Calls and executes the subroutine, and moves forward to the next step. Nesting up to 31 levels. |

FIG.16

(4) Data Processing Instructions

L and S at the end of these codes indicate the data length processed.

| Symbol | Number of figures converted |
|---|---|
| L (long) | 4 figures (16 bits) |
| S (short) | 2 figures (8 bits) |

| Instruction | Symbol | Mnemonic | Operand Type | Operand Kind | Function |
|---|---|---|---|---|---|
| DATA TRANSFER | MOVL or MOVS | MOVL or MOVS | M.U.iH | NOT A | Transfers data A directly to C.<br>A→C |
| | | | M.U | NOT C | |
| ADDITION | ADDL or ADDS | ADDL or ADDS | M.U.iB | NOT A | Provides addition of BCD data.<br>A+B→C |
| | | | M.U.iB | NOT B | |
| | | | M.U | NOT C | |
| SUBTRACTION | SUBL or SUBS | SUBL or SUBS | M.U.iB | NOT A | Provides subtraction of BCD data.<br>A−B→C |
| | | | M.U.iB | NOT B | |
| | | | M.U | NOT C | |
| MULTI-PLICATION | MULL or MULS | MULL or MULS | M.U.iB | NOT A | Provides multiplication of BCD data.<br>MULL: A×B→(C+2),C<br>MULS: A×B→(C+1),C |
| | | | M.U.iB | NOT B | |
| | | | M.U | NOT C | |
| DIVISION | DIVL or DIVS | DIVL or DIVS | M.U.iB | NOT A | Provides division of BCD data.<br>DIVL A÷B→C<br>Remainder→(C+2)<br>DIVS A÷B→C<br>Remainder→(C+1) |
| | | | M.U.iB | NOT B | |
| | | | M.U | NOT C | |
| COMPARISON | CMPL or CMPS | CMPL or CMPS | M.U.iH | NOT A | Compares data A with data B.<br>(A)≷(B)<br>Decision is made by the succeeding CJ instruction.<br>The results are stored in the special relay. |
| | | | M.U.iH | NOT B | |
| CODE CONVERSION BCD→BIN | BINL or BINS | BINL or BINS | M.U.iB | NOT A | Converts BCD data into BIN data.<br>A(BCD)→C(BIN) |
| | | | M.U | NOT C | |
| CODE CONVERSION BIN→BCD | BCDL or BCDS | BCDL or BCDS | M.U.iH | NOT A | Converts BIN data into BCD data.<br>A(BIN)→C(BCD)<br>(Range of A value:<br>S..0~63, L..0~270F) |
| | | | M.U | NOT C | |

FIG. 17

(5) Auxiliary Instructions

| Instruction | Symbol | Mnemonic | Operand | Function |
|---|---|---|---|---|
| NOT SPECIFICATION | NOT | NOT | - | Specifies logical inversion of specified data, in combination with such instructions as CJ,OUT,AND,OR, DATA PROCESSING,etc. |
| CONTINUOUS SPECIFICATION | ~ | ~ | - | Specifies continuous processing of the data from the relay No.specified before this instruction to the relay No.specified after it. |
| LABEL NO. SPECIFICATION | ⋆ | ⋆ | Label No. (0~999) | Indicates the Label No. |
| DATA MEMORY SPECIFICATION | M | M | Data memory No. (0~511) | Specifies data memory,in combination with instructions such as TIM,CNT and DATA PROCESSING. |
| UNIT DATA SPECIFICATION | U | U | Relay No. (0~F7F) | Specifies unit data,in combination with instructions such as TIM.CNT and DATA PROCESSING. Numeric values are expressed in HEX. |
| TIMER COUNTER RESET SPECIFICATION |  | RST | Timer No. (0~127) or Counter No.(0~31) | Specifies timer or counter reset. |
| INDICATION OF LOGICAL OPERATION RESULTS | R | R | - | Indicates the result of logical operation. |

F I G. 18

(6) Connected Line Instructions

| Instruction | Symbol | Mnemonic | Operand | Function |
|---|---|---|---|---|
| NOP | │ | NOP | - | Adjusts graphic layout by providing space for one element in graphic display. |
| LINE LD | ┐ | - | - | Indicates graphic jump from left to down.<br><br>Indicates head of branch program. |
| LINE UL | └ | - | - | Indicates graphic jump from up to left.<br><br>Indicates end of branch program; unconditional jump. |
| LINE LR | ─── | - | - | Indicates graphic jump from left to right, or from right to left. |
| LINE LUD | →  | - | - | Indicates junction, by a graphic jump from left. |
| LINE RUD | ← | - | - | Indicates junction, by a graphic jump from right. |
| LINE RD | ┌ | - | - | Specifies jump destination. |

Table 1

| NO. | Operation | Display of assemble area | Function |
|---|---|---|---|
| 1 | Press `DATA PROCESS MENU` key. Press `1` and `RET` keys. | MOVS | Select NO.1 since menu dis shown in Figure 12D is displayed in message area. Then, MOVS instruction is written into asse--mble data buffer and displayed in assemble area at the same time |
| 2 | Press `*`,`1` and `0` keys. | *10 MOVS | Input label NO. of jump destination |
| 3 | After pressing `SPACE` key press `0` key | *10 MOVS  0 | Designate reray NO. of data transfer source. "0" to "7" denote relay NOs., respectively. |
| 4 | After pressing `SPACE` key, Press `M` and `1` keys | *10 MOVS  0  M 1 | Designate internal memory NO. data transfer destination Transfer to M 1 |

Table 2

| NO | Operation | Display of assemble area | Function |
|---|---|---|---|
| 1 | Press `CJ` key. | CJ / NO / YES | Write branch instruction into assemble buffer and display at in assemble data area. |
| 2 | After pressing `SPACE`, press `1` and `0` keys. | CJ 10 NO YES | Designate a relay NO. which is judged to be branched or not. |
| 3 | After pressing `SPACE` key, Press `*`, `2` and `0` keys. | CJ *20 10 NO YES | Designate label NO. of branch destination. |

Table 3

| NO | Operation | Display of assemble area | Function |
|---|---|---|---|
| 1 | Press [OUT] key | OUT | Display OUT instruction in assemble area. |
| 2 | Press [*], [2] and [0] keys. | *20 OUT | Input label NO. of jump destination |
| 3 | After pressing [SPACE] key, press [NOT], [3] and [8] keys. | *20 OUT NOT 38 | Input operation output relay NO. and designate, by [NOT] key, turn off-of the relay. |
| 4 | After pressing [SPACE] key, press [~] key. | *20 OUT NOT 38 ~ | Designate that this instruction is to be continuous. By this operation, number entered at preceding step is mode operation start relay number. |
| 5 | After pressing [SPACE] key, press [3] and [F] keys. | *20 OUT NOT 38 ~ 3F | Input operation endrelay NO. An instruction for simultaneous turn off of output relay Nos. 38 to 3F is completed. |

Table 4

| NO. | Operation | Display of assemble area | Function |
|---|---|---|---|
| 1 | Press [TIM] key | TIM data | Display timer instruction in assemble area. |
| 2 | After pressing [SPACE] key, press [1] key. | TIM 1 data | Disinate timer NO. to be used. |
| 3 | After pressing [SPACE] key, press [5] key. | TIM 1 data 5 | Disinate time length (0.5 sec.) |

PROGRAM GENERATOR

BACKGROUND OF THE INVENTION

1. Field of the Invention:

The present invention relates to a program generator, and more particularly to a program generator by which a flow-chart depicted on a display screen can be edited as desired by the system designer and when the edition is complete, a program can be automatically generated corresponding to the flow-chart.

2. Description of the Prior Art:

Recently, many warehouses, for example, are automated; namely, warehousing is done these days in the following manner: the freight carried on the belt conveyor is subject to selection by means of a bar code reader or the like at a post in the warehousing line, and further carried on the belt conveyor to those previously defined blocks of the warehouse, for which they are bound as designated at the selection post depending upon their warehousing parameters such as kind, quantity, address or destination, delivery date, etc. On the due delivery date, the freight having been warehoused as above are automatically taken out for transportation on trucks to their respective destinations.

When designing such a automated warehousing system, the system designers take into consideration how the freight is to be treated while being carried on the conveyor system within the warehouse and how to assemble a warehousing system which can handle the freight in a reduced time and with less costs.

In designing a such system, the system designers use generally a flow-chart which permits expressing the movement of the freight in a time series (for example, the flow-chart shown in FIG. 8) and also review the flow-chart by delineating it by a pencil on a sheet of paper.

In many cases, however, a specification of an automated warehousing system as described above and which is first proposed to a system designer is subject to various subsequent changes for various reasons. In such case, the flow-chart will of course also be changed and so the flow-chart must be used with additions or deletions or a new flow-chart be drawn. Thus, the system designers will have to take extremely great pains in designing such a system while creating a flow-chart or flow-charts.

Also when an automated warehousing system as described above is designed and a flow-chart of the system is completed, a subsequent process requiring the automated warehouse function to be according to the logic of the complete flow-chart. Generally, a control computer is used for this purpose.

The languages for use in such control computer include dedicated languages such as ladder diagram, ASSEMBLER, or a variety of advanced languages such as C language, BASIC, etc; however, those who can use a such programming language to create a program precisely based on a given flow-chart are such programmers as are appropriately trained and have a special technique in the field of art. Also, the larger the scale of the automated warehouse, the longer the time for programming. Thus, designing of an automated warehouse in which the freight are systematically handled and moved requires a long time and huge costs.

SUMMARY OF THE INVENTION

The present invention has an object to provide a program generator by which flow-chart designing can be done as desired by any system engineer and further a programming language corresponding to the completed flow-chart can be automatically created.

The above object can be accomplished by providing a program generator, according to the present invention, comprising:

means for displaying at least symbols for flow-chart elements;

means for inputting a programming language;

first means of converting a language inputted by said language input means into flow-chart element symbols;

flow-chart editing means by which a flow-chart can be depicted on said display means and edited as desired through operation of said language input means; and second means for converting into a predetermined programming language a program corresponding to said edited flow-chart;

wherein the flow-chart displayed on said display means is corrected and applied with additions or deletions until it is made complete; then a program is generated in a predetermined language corresponding to the complete flow-chart.

Also the above object can be attained by providing a program generator, according to another aspect of the present invention, comprising:

means for displaying at least symbols for flow-chart elements;

means for inputting a programming language;

first means for converting a language inputted by said langugage input means into flow-chart element symbols;

flow-chart editing means by which a flow-chart can be depicted on said display means and edited as desired through operation of said language input means;

second means for converting into a predetermined programming language a program corresponding to said edited flow-chart; and means for transferring the programming language generated by said second conversion means to an external equipment separately provided, wherein the flow-chart displayed on said display means is corrected and applied with additions or deletions until it is made complete; then a program is created in a predetermined language corresponding to the complete flow-chart and the program is transferred to said external equipment.

A further object of the present invention is to make it possible to use a programming language for use in a programmable controller which can be applied for sequential controls of various specifications.

These and other objects and advantages of the present invention will be better understood from the ensuing description made by way of example of the preferred embodiments according to the present invention with reference to the drawings:

BRIEF DESCRIPTION OF THE DRAWINGS

FIG. 13 shows an example programming language for use in the inventive program generator, showing the basic instructions in a simple programming language, which are used to operate the external programmable controller;

FIG. 14 to 18 show applied instructions for bit processing, group subroutine instructions, data processing instructions, auxiliary instructions and other instructions, respectively, in the simple programming language for use in the programmable controller shown in FIG. 13;

DETAILED DESCRIPTION OF THE PREFERRED EMBODIMENTS

Figure 1:
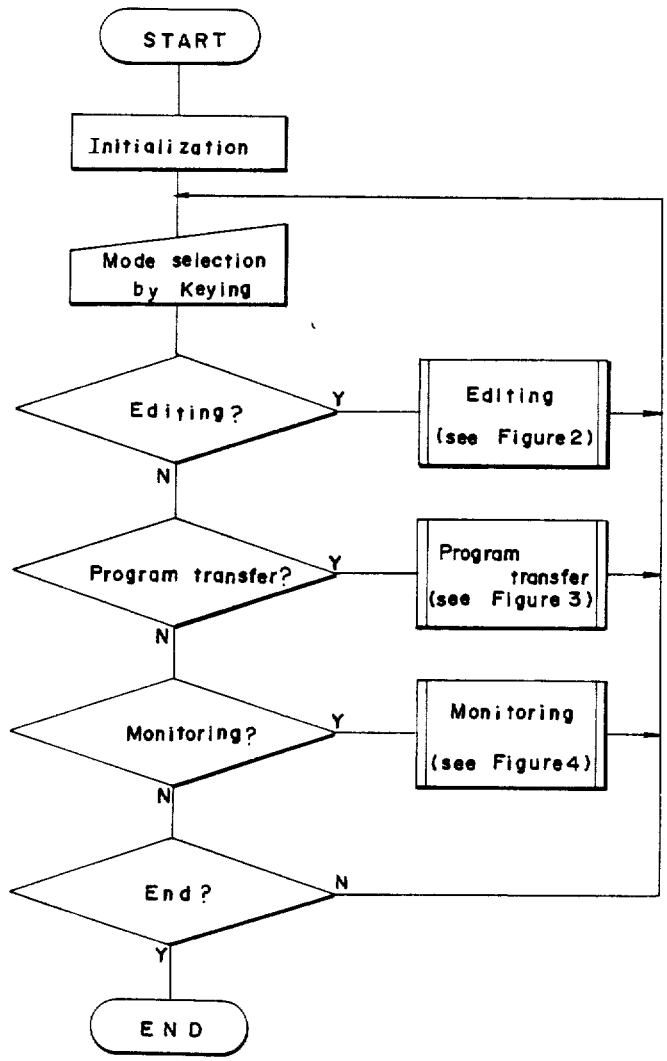
FIG. 1 is a flow-chart showing the operation of the entire program generator according to the present invention.

The program generator will be described with reference to the preferred embodiment shown in the drawings.

Figure 2:
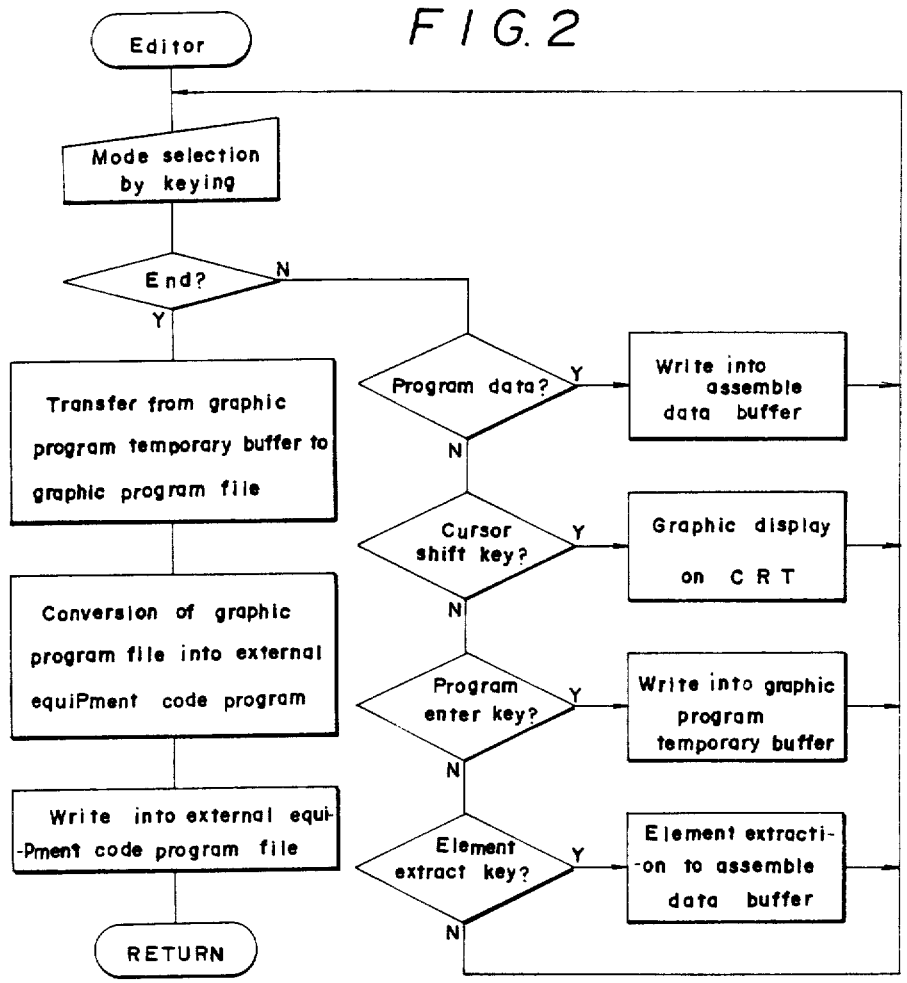
FIG. 2 is also a flow-chart showing the operation of the program edition shown in FIG. 1.
Figure 3:
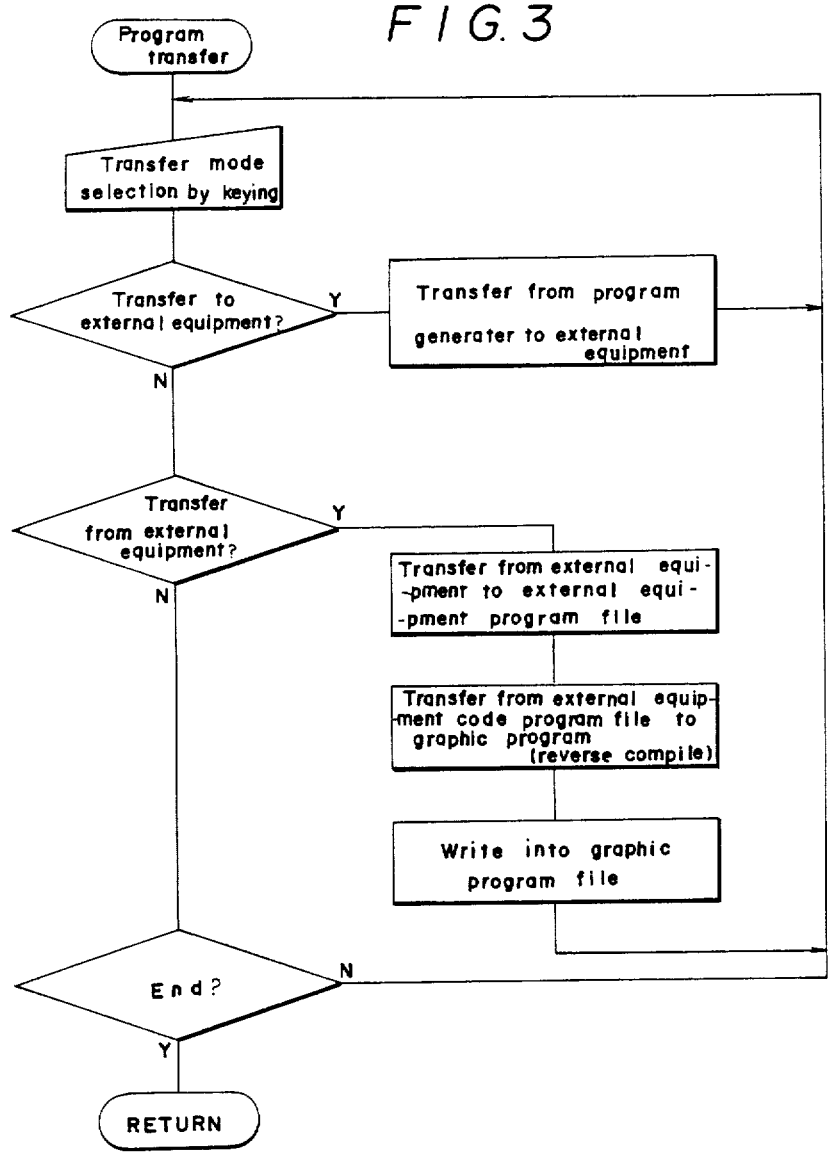
FIG. 3 is a further flow-chart showing the operation of the program transfer means shown in FIG. 1.
Figure 4:
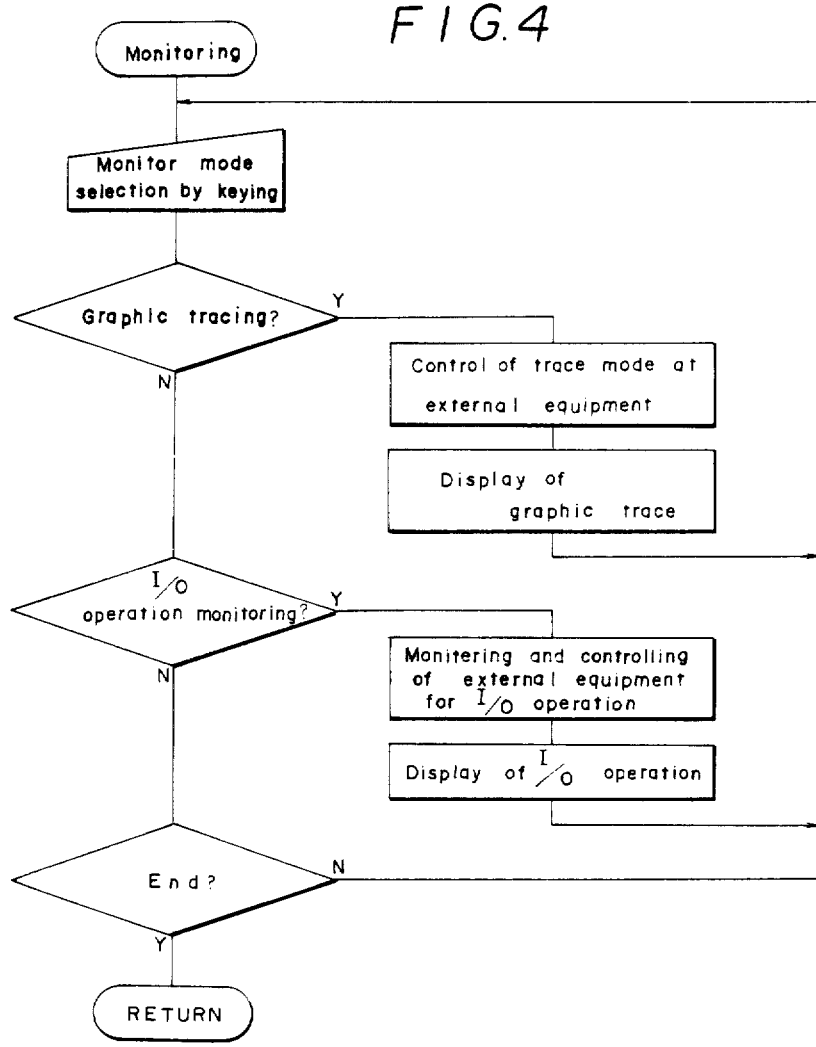
FIG. 4 is also a flow-chart showing the operation of the monitor shown in FIG. 1.

FIG. 1 is a flow-chart showing the operations of the entire program generator according to the present invention, and FIGS. 2 to 4 show a flow-chart of each of the operations, respectively, shown in FIG. 1.

As seen from FIG. 1, the program generator according to the present invention has an editing function to write, delete or insert, as desired, instructions, etc. into a flow-chart depicted on a display screen of any vacuum tube cathode-ray tube (will be referred to as "CRT" hereinafter), a program transfer function to transfer to an external equipment, for example, a programmable controller a program having been automatically created corresponding to the logic of a flow-chart completed by repeating such edition, and a function to monitor the operations of said external equipment by displaying it in the form of a flow-chart or functional time chart on said display screen.

Each of the above-mentioned functions will be described in more detail with reference to FIGS. 2 to 5.

The editing function is performed according to the flow-chart shown in FIG. 2.

As seen in FIG. 2, when the edit mode is keyed in, any one of the subroutines write program data into an assemble data buffer (a memory which temporarily stores individual flow-chart symbols which will be referred to as "element" hereafter), shift the cursor for designating a position on the display screen where an edition is desired, entry of a program for entry into a graphic program temporary buffer (which stores temporarily flow-chart program data) for an element inside said assemble data buffer, and element extraction for shifting any element designated by said cursor from a flow-chart program displayed on the display screen into the assemble data buffer, can be effected as selected.

Figure 8:
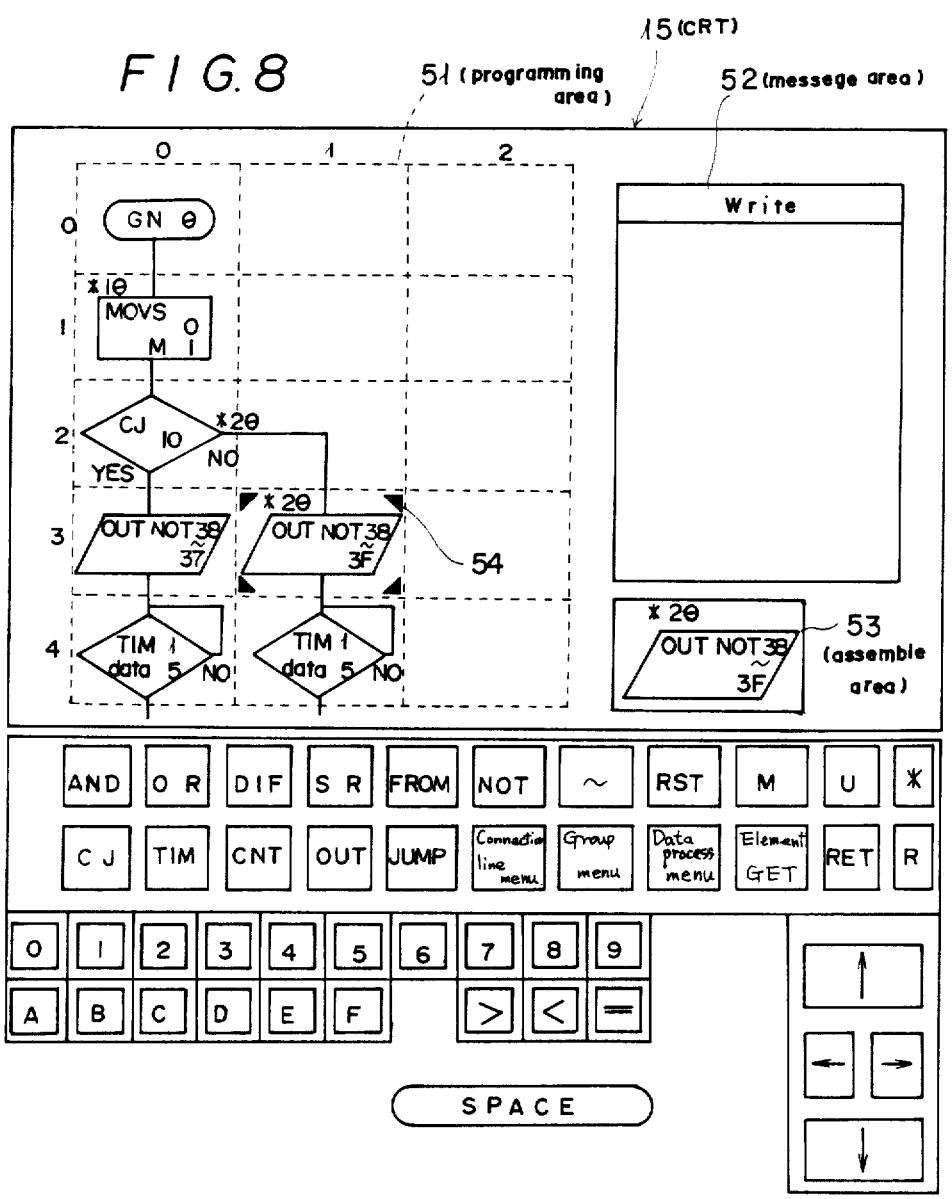
FIG. 8 shows a display screen and language input means of the program generator shown in FIG. 6.

The "element" referred to herein means a symbol used in a flow-chart, and this symbol is depicted in a small one section defined with dot line in the programming area on the display screen as shown in FIG. 8, which will be described later.

Next, the operations in a flow from "pressing of input key to program data" in FIG. 2 will be described with reference to the functional diagram in FIG. 5.

Figure 5:
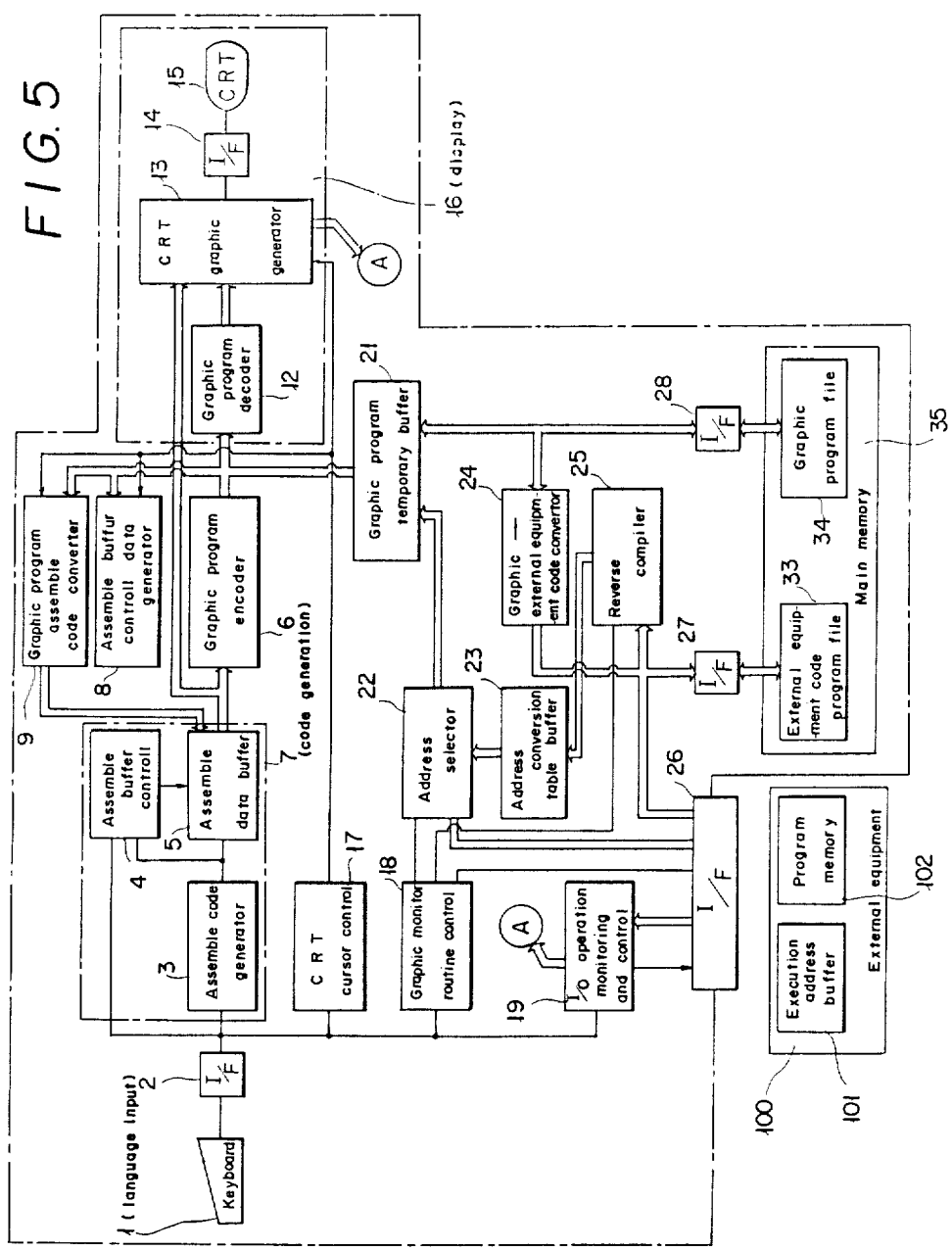
FIG. 5 is a functional block diagram showing each of the functions of the inventive program generator.

When any of the program data keys (for example, AND, OR, TIME keys, etc.) on a keyboard 1 which will be further described later with reference to FIG. 5 is pressed, a corresponding signal is sent via an interface 2 to an assemble code generator 3. The "assemble code" referred to herein is a code used at the intermediate stage of a code which represents an element which is finally displayed on the display screen. This assemble code is temporarily stored in an assemble data buffer 5. The code data delivered from said assemble code generator 3 is controlled for entry to the assemble data buffer 5 by an assemble buffer controller 4. Note that the assemble code generator 3, assemble buffer controller 4 and assemble data buffer 5 are included together in a code generator 7.

Next, the operation of "cursor shift key?" in FIG. 2 will be described.

By operating the cursor shift key (for example, "→" key) on the keyboard 1 which will be described later with reference to FIG. 5, a cursor shift signal is supplied as input via the interface 2 and sent to a CRT cursor controller 17 which controls the movement of the cursor within the CRT screen. Then, a cursor position signal will be sent from the CRT cursor controller 17 to a CRT graphic generator 13 to produce a cursor signal which will be displayed on a CRT screen. This cursor signal is sent to said CRT 15 via an interface 14.

When the "program entry" shown in FIG. 2 is done by pressing the "RETURN" key (see FIG. 8), a program enter signal is delivered from the keyboard 1 through the interface 2 to the assemble buffer controller 4 to produce a graphic program through a graphic program encoder 6, etc. This graphic program will be written into a graphic program temporary buffer 21.

For the "element extraction" shown in FIG. 2, pressing the "element GET" key on the keyboard 1 as shown in FIG. 5 will enter an element extraction signal through the interface 2.

Then, the program data for the element designated by the cursor as described previously is sent from the graphic program temporary buffer to an assemble buffer control data generator 8 which creates an assemble buffer control information and a graphic program slash assemble code converter 9 which converts a graphic program into an assemble code, an extracted element is written into the assemble data buffer 5, and the assemble buffer control information is written into the assemble buffer controller 4.

When all the operations in the "editor mode" shown in FIG. 2 are ended by pressing the END key, all the programs are written into a graphic program file 34, and also a code converter 24 will convert a program from the graphic program file into an external equipment code program which is to be written into an external equipment code program file 33.

The "program transfer" in FIG. 2 will be described.

As will be described later, a program created by a program generator 40 (see FIG. 40) is stored in the external equipment code program file 33 forming a part of the program generator 40.

When the mode of transfer from the keyboard 1 to any external equipment is keyed in, the program stored in the external equipment code program file 33 is transferred to the external equipment 100.

On the contrary, in case of a program transfer from any external equipment, the program will be transferred from a program memory 102 forming a portion of the external equipment 100 as shown in FIG. 5 to the external equipment code program file 33 via the interface 2, and converted by a reverse compiler 25 into a graphic program which will be written from the external equipment code program file 33 into the graphic program file 34. The reverse compiler 25 has a function of converting the contents of said program memory 102 into a graphic code program corresponding to any element such as decision symbol, process symbol, etc, which are displayed on the CRT 15.

The reason why the reverse compiler 25 is required, the functional diagram thereof and the operating procedure thereof will be explained in detail with reference to FIGS. 9 to 11:

The external equipment code program created by the inventive program generator is stored in the program memory 102 forming a portion of the external equipment 100. When it is intended to change or make any addition to this stored external equipment code program, it is necessary to make such changes in the program while being displayed on the CRT 15 of the program generator 40 which will be further described later.

For this operation, however, the external equipment code program stored in the program memory 102 has the codes disposed simply "one-dimensionally" while the codes displayed in a programming area 51 on the screen of CRT 15 must be represented two-dimensionally as elements such as decision symbol, processes symbols, etc. Therefore, it is necessary to convert the "one-dimensional" codes into program codes which can be displayed two-dimensionally. The reverse compiler 25 is provided for this purpose.

Figure 11:
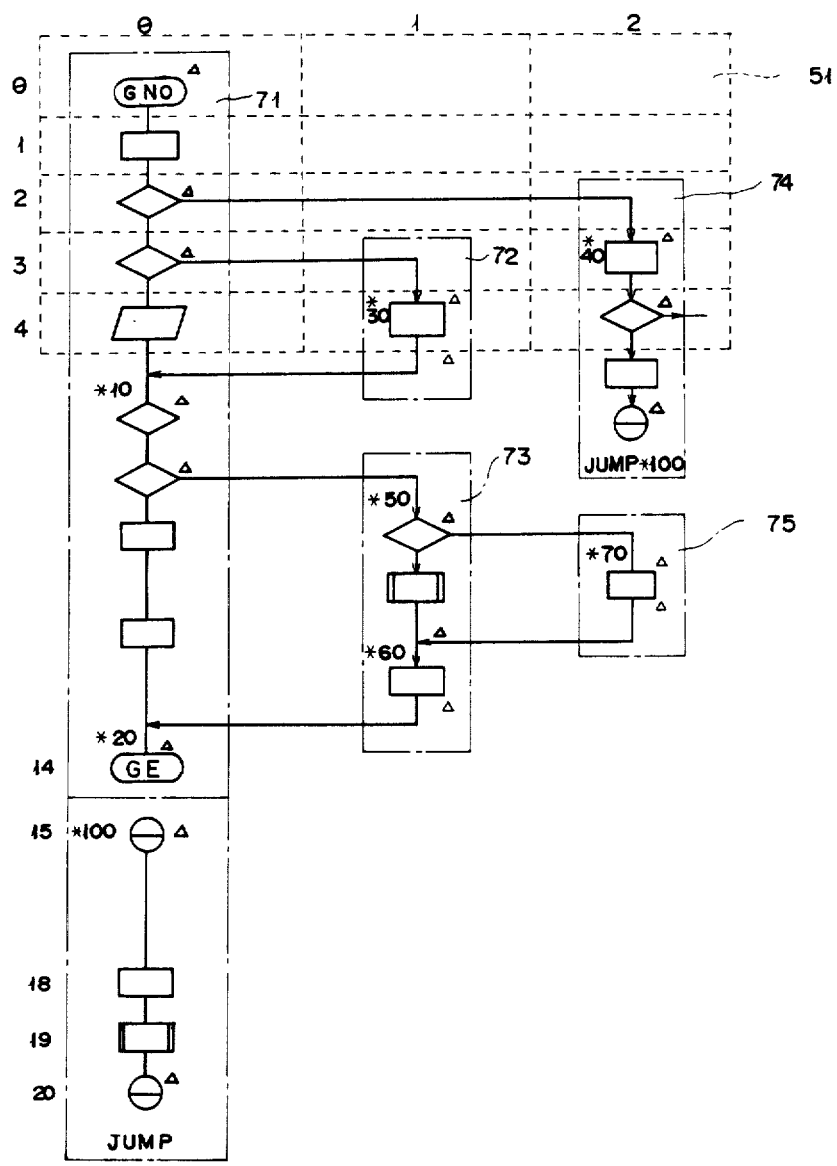
FIG. 11 shows an example flow-chart for explanation of the concept of said reverse compiler.

The flow-chart shown in FIG. 11 is an example or a flow-chart completed by the program generator according to the present invention. The programming area 51 indicated as enclosed in dash line blocks in this flow-chart is displayed on the display area of the CRT 15 as will be described later. The lower portion other than displayed in the programming area 51 in FIG. 11 will not be displayed on the CRT 15 if it is in the concurrent state. However, by printing out using an appropriate means as will be described later, the entire flow-chart shown in FIG. 11 will be obtained as a hard copy.

In the flow-chart in FIG. 11, the elements from the top one GNO down to the element GE in the column No. 0 are connected to each other in line, which is a main routine in the flow-chart in FIG. 11. The element block in this main routine is indicated with a reference numeral 71.

Similarly, the column No. 1 has branch routine blocks 72 and 73 branched from said main routine, and the column No. 2 includes element groups 74 and 75 of the branch routines, respectively.

The above-mentioned block 71 includes decision blocks from which connection lines are drawn to the blocks 72, 73 and 74, respectively. Furthermore, a connection line is drawing from the branch point of the decision elements of said block 73 to the block 75.

In case the elements are decision branch, jump and label instructions, the connection line moves to another column. The moving point is called a graphic point and it is represented by a small triangle mark in FIG. 11.

As described above, in the conversion of "one-dimensional" codes stored in the program memory 102 of the external equipment 100 into "two-dimensional" codes stored in the program memory 102 of the external equipment 100 into "two-dimensional" ones, it is necessary to process them by specifying the graphic points as mentioned above.

Next, the means for converting the one-dimensions codes into two-dimensional ones will be explained with reference to FIG. 9 and 10.

Figure 9:
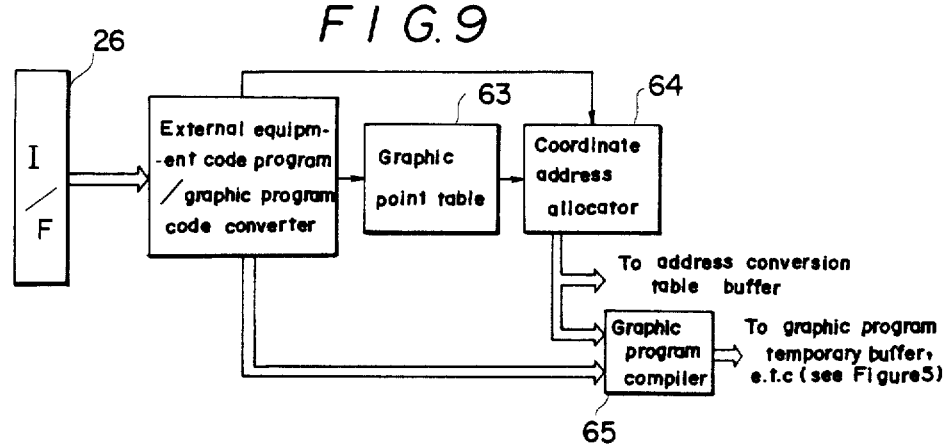
FIG. 9 and 10 show the functions and operating processes, respectively, of the reverse compiler shown in FIG. 5.
Figure 10:
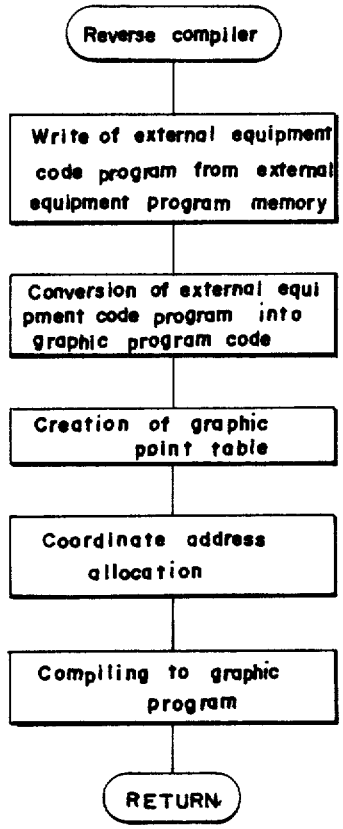

The functional diagram of the reverse compiler 25 has a configuration as shown in FIG. 9. As seen, the external equipment code program taken out of the program memory 102 of the external equipment 100 is read by the interface 6 and taken into a converter 62 in which the external equipment code program is converted into a graphic program code. The code from this converter 62 is delivered to a graphic pointer table 63 and graphic compiler 65. The graphic pointer table 63 will detect said graphic points and temporarily stores the address of each detected graphic point as shown in FIG. 11.

The code delivered as output from said graphic pointer table 63 is sent to a coordinate address allocator 64 which judges based on the output data from said converter 62 and the output from the graphic pointer table 63 whether the entire flow-chart is accomodated or not in the coordinate system shown in FIG. 11, and also gives a coodinate address to each element displayed on the display screen.

The data thus processed by the converter 62 and coordinate address allocator 64 is sent to a graphic program compiler 65 where a graphic program code is programmed and from which it will be sent to a graphic program temporary buffer, etc. The signal from the coordinate address allocator 64 is also sent to address conversion table buffer 23 (see FIG. 5) and its use in the graphic tracing which will be described later. The reverse compiling is thus effected.

Furthermore, when the "monitor mode" key shown in FIG. 4 is pressed, it is judged whether a graphic trace mode in which a flow-chart displayed on the display screen is to be traced is established or not. If it is, when the key on the keyboard 1 and provided for selection of graphic trace is pressed, a mode signal is supplied as input through the interface 2 and sent to a graphic monitor routine controller 18 which delivers to the external equipment 100 and reverse compiler 25 an instruction for program transfer from the external equipment, instruction for creation of address conversion table, instruction for changeover of the external equipment into trace mode, and a signal of control over the graphic tracing operation. Under these instructions, the address conversion table 23 will have generated therein an address conversion table buffer according to the program transfer instruction, and an excution address buffer 101 will have stored therein an address of a program executed by the external equipment 100. Thereafter, a graphic program corresponding to an selected execution address as a corresponding key is pressed by the operator is displayed on the CRT screen.

Figure 19:
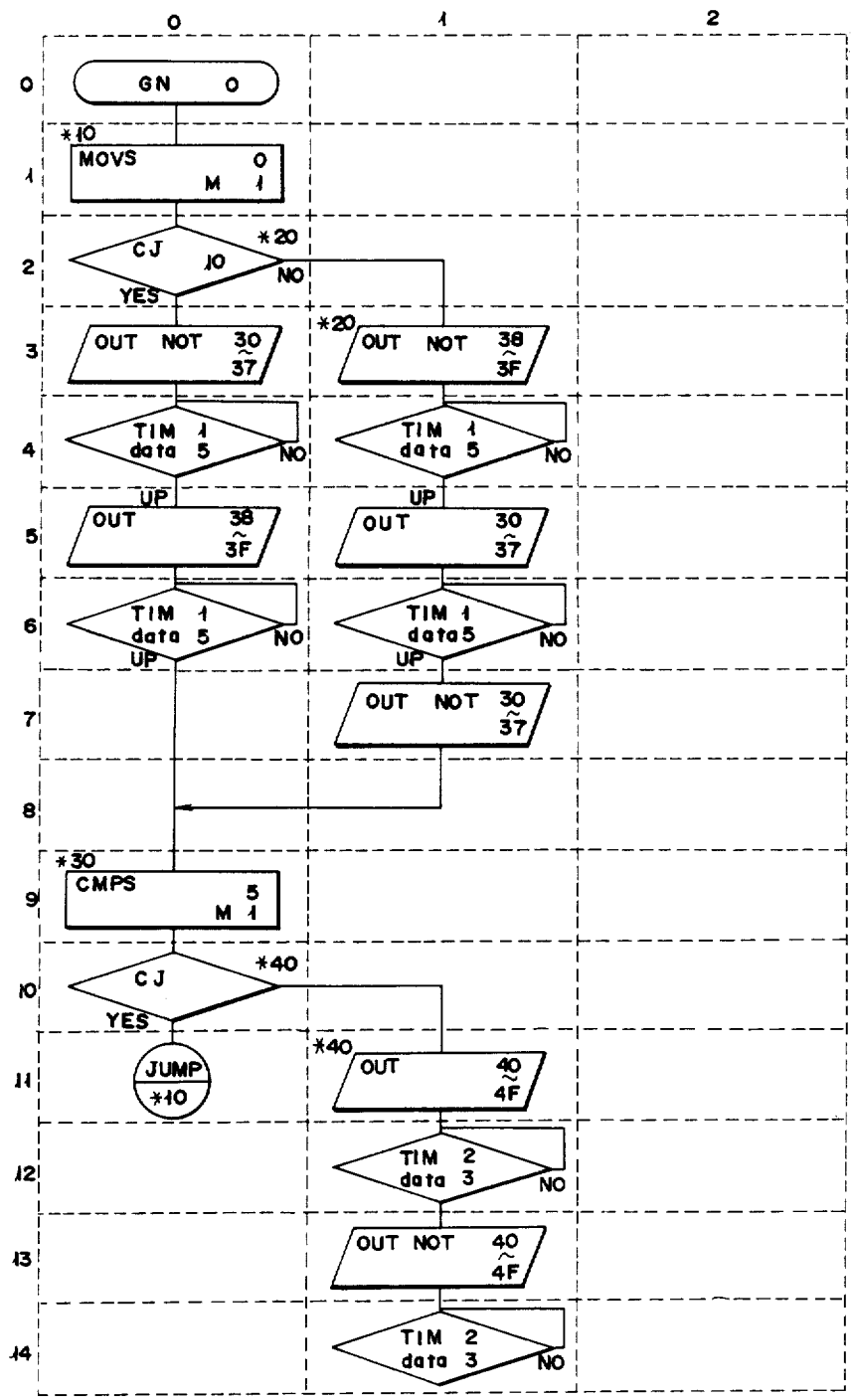
FIG. 19 shows an example of a flow-chart created by using the inventive program generator.
Figure 21:
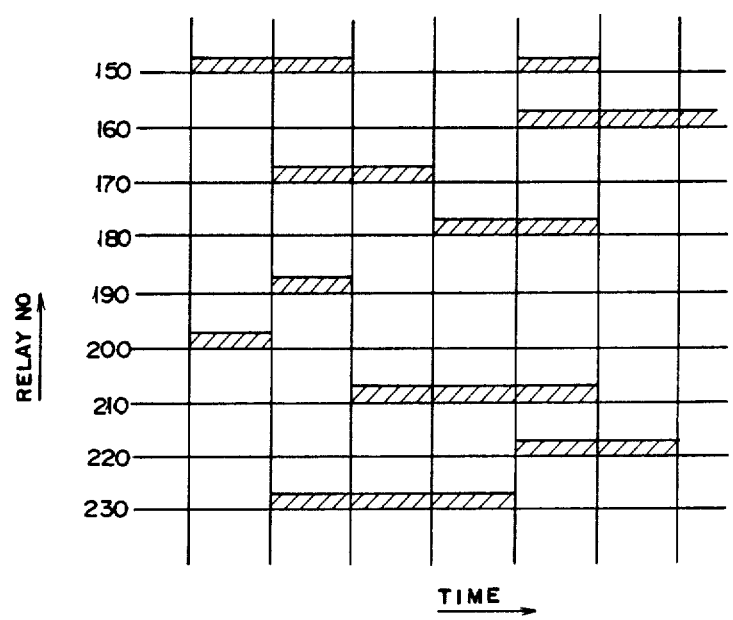
FIG. 21 is a functional time chart showing the operations of an input/output unit of the external programmable controller when a controlled equipment is operated as connected to said programmable controller as shown in FIG. 6.

Also, in case the "monitor mode" is the "operation monitor" in which the operation of the interface of the input/output of the external equipment 100 is monitored, an I/O operation monitor instruction is sent from an I/O operation monitor control 19 shown in FIG. 19 to the external equipment 100, and the CRT will receive an I/O operation signal from the external equipment 100 to display the operation through a graphic generator 13 (see FIG. 21).

The basic operation of the program generator 40 is done in the manner mentioned above.

Figure 7:
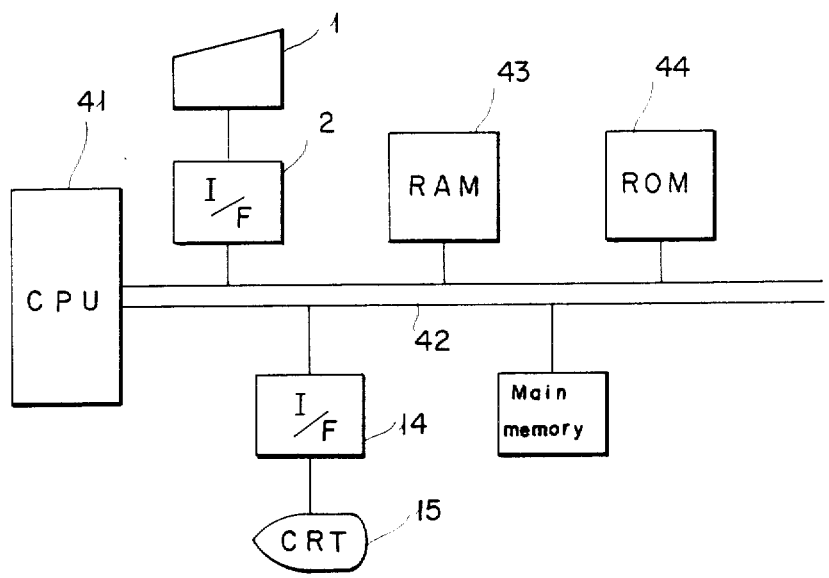
FIG. 7 is a block diagram showing the essential portions of an electric circuit used in the program generator shown in FIG. 6.

The essential electrical components of this program generator 40 are constructed as shown in FIG. 7.

The keyboard 1 is connected through the keyboard interface 2 to a bus line 42 of a central processing unit (will be referred to as "CPU" hereinafter) consisting of a microcomputer, etc. Further, the bus line 42 has connected thereto the CRT 15 through a CRT interface 14 and also connected thereto a random access memory (will be referred to as "RAM" hereinafter) 43, read-only memory (will be referred to as "ROM" hereinafter) 44 and a main memory 35.

The ROM 44 stores a system program (operating system) to implement various functions such as control of the program generator 40 shown in FIG. 5, conversion, generation, etc. The keyboard 1 is equipped with various keys as shown in FIG. 8 and which will be described later. An input signal from the keyboard 1 is decoded by the keyboard interface 2 to provide a necessary signal to the CPU 41.

The main memory 35 consists of the external equipment code program file 33 for storage of a machine language converted for use in the external equipment as described previously, and a graphic program file 34 which stores graphic program.

The electrical hardware of the inventive program generator 40 is constructed as described in the foregoing.

Figure 20:
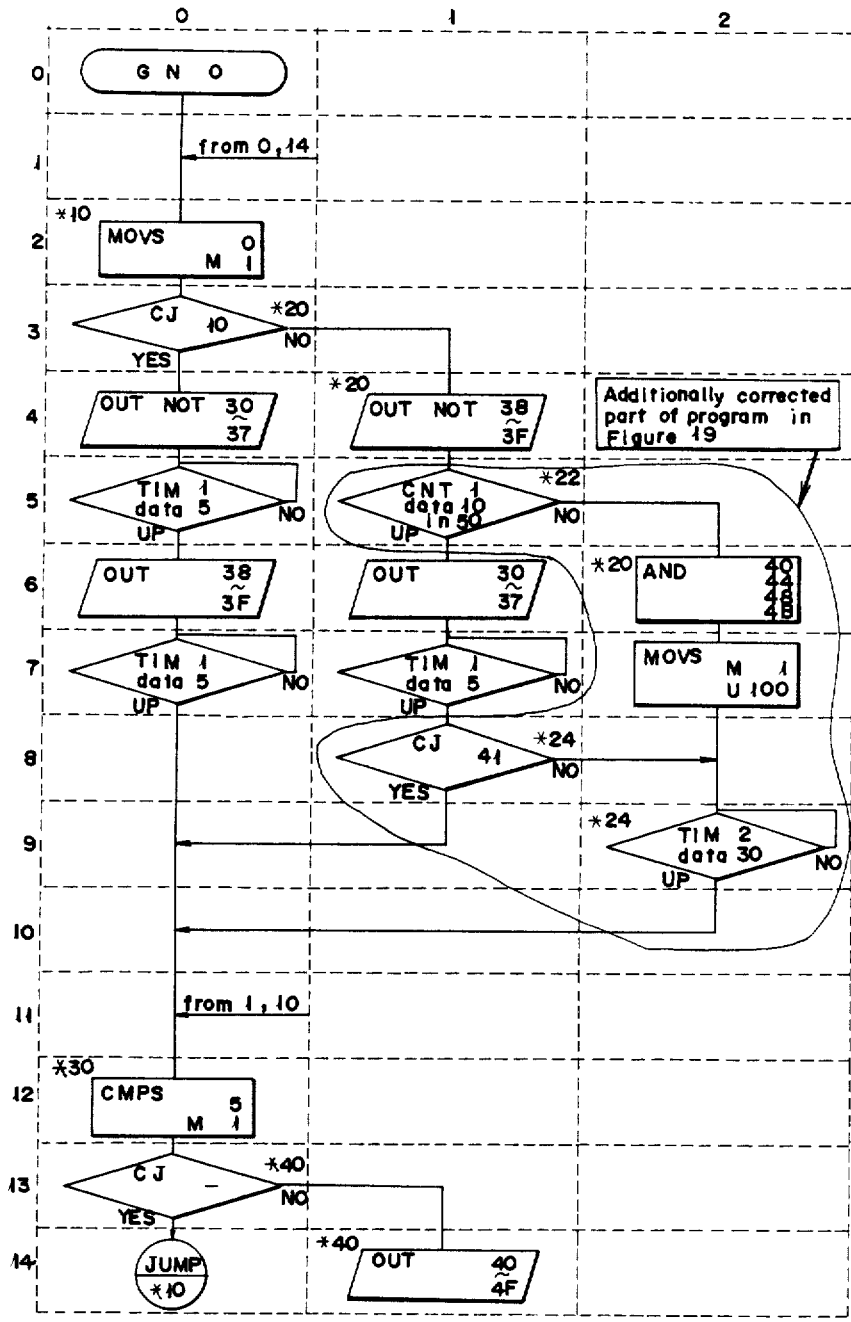
FIG. 20 is a flow-chart resulted from the flow-chart shown in FIG. 19 by additionally correcting a part of the latter.

Next, a graphic language for using a programmable controller as an external equipment will be explained with reference to FIGS. 19 to 21 as a definite example of a flow-chart like graphic language for use in the program generator 40 shown in FIG. 6. The graphic language system of flow-chart type for use with said programmable controller consists of:

(1) Basic instruction as in FIG. 13;
(2) Instruction for application of bit process as in FIG. 14
(3) Group subroutine instruction as in FIG. 15;
(4) Data process instruction as in FIG. 16;
(5) Auxiliary instruction as in FIG. 17; and
(6) other instructions as in FIG. 18.

Next, the definite construction of the keyboard 1 and CRT 15 shown in FIG. 15 will be explained with reference to FIG. 8.

As seen in FIG. 8, the display screen of CRT 15 is divided into three areas. That is, the generally left half of the screen is a programming area 51 where division symbol, process symbol, etc. which are flow-chart elements are displayed. This programming area 51 is further divided into two areas (3) and (5) in X and Y directions, respectively. Numerals like "0,1,2" are displayed in the X direction, while in the Y direction, there are displayed numerals like "0,1,2,3,4". Each of the sub-areas can be represented by designating the coordinate axes like "0,0", "3,1", etc. This designation of coordinate axes is called "element addressing".

There is formed at the upper right portion of the CRT screen a message area 52 where, when the program generator 40 is operated, it is displays which kind of operation is to be done for a "next process". Typical examples of such messages displayed in the message area 52 are shown in FIGS. 12A to 12D.

Further, at the lower right portion of the screen of CRT 15, there is formed an assemble area 53 where the contents of the assemble data buffer are to be displayed. It should be noted here that the element buffer is a temporary memory for use in creation and change of any element as having been previously described.

Here, the construction of the keyboard 1 will be described with reference to FIG. 8.

As seen from FIG. 8, the keyboard 1 has arranged thereon various keys carrying symbols corresponding to various instructions such as the previously-mentioned "basic instruction", "instruction for application of bit process", "auaxiliary instruction", etc. Further, this keyboard 1 has located thereon numeral keys for the numerals 0 to 9, letter keys for letters of A to F, cursor shift keys, space key, etc.

The operation of the program generator 40 thus constructed will be explained. The program generator 40 has the ROM 44 previously shown in FIG. 7 and which stores a graphic flow-chart language system having been described above.

First, when the power switch (not shown) is turned on, the initialization shown in the flow-chart is effected, so that the program generator 40 will take the standby status.

Figure 12A:
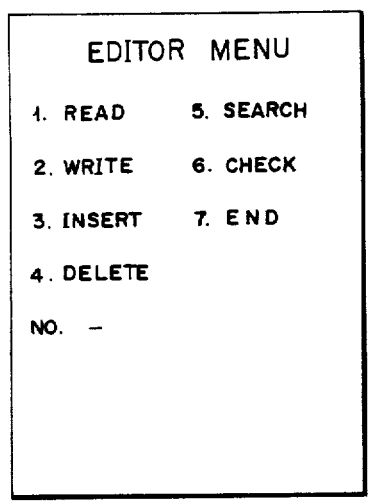
FIGS. 12A to 12D show the typical messages displayed in the message area of the display screen shown in FIG. 8.
Figure 12B:
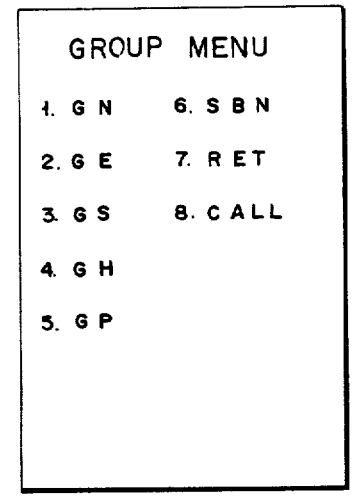

By pressing the "group menu key" among the keys on the keyboard shown in FIG. 8, a group menu shown in FIG. 12B is displayed in the message area 52 on the screen of CRT 15. The group menu is referred to in FIG. 12A.

By pressing the "1" key for the item number in the group menu, a symbol (GN), instruction indicative of the top one of the series of programs is displayed in the assemble area 53. Then, press the "0" key, and an element of GN0 is completed. By operating the cursor shift keys shown in FIG. 8 to shift the small angular-mark cursors to the four corners of a sub-area (1,3) of the programming area 51, a position (0,0) is designated on the programming area 51, and then press the "RET" key on the keyboard, which indicates the program entry. The graphic element (GN0) will be shifted to the sub-area (0,0), and the status shown at the upper left corner of FIG. 8 will be established.

Next, an element MOVS indicating the data transfer process is inputted to a sub-area (0,1). For this purpose, first the element is completed in the assemble area 53 by the means as shown in Table 1, and after the cursor 54 is shifted to the sub-area (0,1), the "RET" key is pressed. The element MOVS will be inputted at this time.

Then, a CJ instruction, being a conditional branch instruction, is written into a sub-area (0,2) by the means shown in Table 2 and by operating the cursor shift keys. The "*20" and "1,0" displayed in this sub-area (0,2) denote a branch destination label and a number for a relay of which the condition is to be judged, respectively.

Also, an element of OUT instruction is displayed in the sub-area (1,3). This instruction is an output instruction, and "*20" is displayed herein. The "*20" is an instruction label indicative of a jump destination of a conditional branch instruction (CJ) displayed in the sub-area (0,2).

Also the graphic element "OUT" displayed in the sub-area (1,3) and timer wait element "TIM" in the sub-area (1,4) are those written in their respective areas after having been generated in the assemble area 53 by the means shown in Tables 3 and 4 in the similar manner as above. Also the elements displayed in other sub-areas (0,3) and (0,4) are similarly written.

Figure 12C:
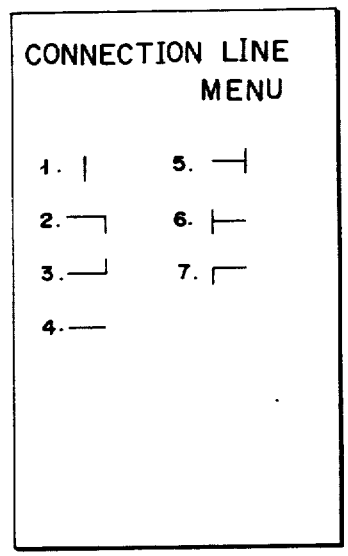
Figure 12D:
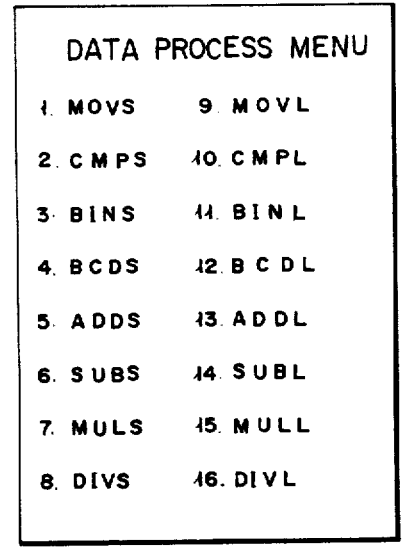

By pressing the "connection line menu" key, a "connection line menu" shown in FIG. 12C is displayed in the message area 52. In case a connection line displayed in the sub-area (1,2) for example is selected, "2" is selected in the "connection line menu". The cursor 54 is shifted to the sub-area (1,2) beforehand, and by pressing the "RET" key in this state, the connection line displayed in the sub-area (1,2) will be written into the programming area 51. Subsequently, similar operations are repeatedly done to display connection lines in sequence in any selected areas, as designated, in the programming area 51. Then, a flow-chart shown in FIG. 8 will be displayed on the screen of CRT 15.

FIG. 12A shows "editor menu", 12B "group menu", 12C "connection line menu" and 12D shows "data process menu".

By repeating the above-mentioned operations, any complicated flow-chart can be completed. For example, a flow-chart shown in FIG. 19 can be created and printed out through an interface (not shown).

If any addition to or change of the specification is required as the result of reviewing the printed-out flow-chart shown in FIG. 19, the program generator 40 may be used again to effect such necessary addition or change with respect to the flow-chart. A final flow-chart applied with any additions and changes is as shown in FIG. 20.

The finally completed flow-chart program will be stored into the graphic program file 34 shown in FIG. 5, and such graphic program will be stored to the external equipment code program file 33 through the interface 27 after being converted into an external equipment code (code for programmable controller) by the second conversion means, namely, the graphic to external equipment code converter 24.

The external equipment code program (for the programmable beforehand, and by pressing the "RET" key in this state, the connection line displayed in the sub-area (1,2) will be written into the programming area 51. Subsequently, similar operations are repeatedly done to display connection lines in sequence in any selected areas as designated, in the programming area 51. Then, a flow-chart shown in FIG. 8 will be displayed on the screen of CRT 15.

FIG. 12A shows "editor menu", 12B "group menu", 12C "connection line menu" and 12D shows "data process menu".

By repeating the above-mentioned operations, any complicate flow-chart can be completed. For example, a flow-chart shown in FIG. 19 can be created and printed out through an interface (not shown).

If any addition to or change of the specification is required as the result of reviewing the printed-out flow-chart shown in FIG. 19, the program generator 40 may be used again to effect such necessary addition or change with respect to the flow-chart. A final flow-chart applied with any additions and changes is as shown in FIG. 20.

The finally completed flow-chart program will be stored into the graphic program file 34 shown in FIG. 5, and such graphic program will be stored to the external equipment code program file 33 through the interface 27 after being converted into an external equipment code (code for programmable controller) by the second conversion means, namely, the graphic to external equipment code converter 24.

Figure 6:
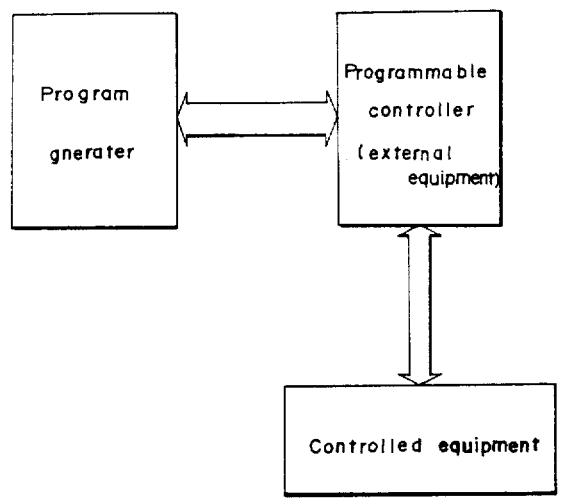
FIG. 6 shows a configuration of a system consisting of the inventive program generator, an external programmable controller and a controlled equipment controlled by this programmable controller, all connected together.

The external equipment code program (for the programmable controller) completed by the program generator 40 shown in FIG. 6 will be transferred to the external equipment, namely, the programmable controller 100.

A controlled equipment will be operated under the program thus transferred. In this case, the input/output device of the programmable controller 100 can be monitored to monitor the relays used in the input and output, respectively, as shown in FIG. 2.

In FIG. 21, time is taken along the horizontal axis while relay numbers are taken along the vertical axis. This arrangement permits easy monitoring of which relay is on or off at a selected time.

The present invention is not limited to the embodiment described in the foregoing, but it can be embodied as modified in various manners. For example, the program generator is used herein with a language system for a programmable controller, but C language or BASIC language, namely a conventional language system, may be used instead. Of course, any appropriate simple language system may be used.

The embodiment has been described and illustrated which uses an independent program generator, but a ordinary personal computer (for example, PC9801 by NEC) may be used.

In this case, the function keys and shift keys on the personal computer may be used in place of the dedicated keys such as AND,OR,TIM, etc. provided on the keyboard 1 (shown in FIG. 8).

Also, the operating system need not be stored in the ROM as having been described in the foregoing, but it may be used as transferred from an external memory where it is stored, to RAM. Namely, RAM may be used for the ROM.

What is claimed is:

1. A flowchart generator having an editing mode for preparing a flowchart, for writing instructions on said flowchart, and for deleting or inserting instructions from or on the flowchart, a program transfer mode for transferring a prepared program for external equipment, and a monitor mode for monitoring operation of said external equipment, said generator comprising:
   input means for inputting data descriptive of a flowchart to be generated, including user instructions, and for setting one of said editing, program transfer and monitoring modes;
   a display for displaying a flowchart to be generated, said flowchart to be generated being comprised of flowchart symbols;
   a code generator comprised of an assemble code generator connected to said input means for receiving program data input via said input means and for generating an assemble code as an intermediate code of a graphic program code representative of each said flowchart symbol for intermediate processing to prepare said flowchart to be prepared, an assemble data buffer connected to said assemble code generator for temporarily storing said assemble code generated by said assemble code generator and for storing flowchart symbols extracted in the editing mode in conformity with user instructions input via said input means, and an assemble buffer control connected to said assemble code generator and to said assemble data buffer for controlling the transfer, for flowchart preparation and editing, of said assemble code generated by said assemble code generator to said assemble data buffer;

a graphic program code generator connected to said code generator and to said display for generating said graphic program code based upon said assemble code in conformity with said user instructions input via said input means and for transmitting said graphic program code to said display for displaying a prepared flowchart thereon;

a display cursor control connected to said input means and to said display, in the editing mode, for specifying and editing the position of the flowchart displayed on said display and needed to be corrected or added with any symbol for editing, and for extracting and transmitting a flowchart symbol located in said editing position to said code generator for editing therein;

a graphic program temporary buffer connected to said graphic program code generator and display for temporarily storing therein said graphic program code generated in said graphic program code generator and for storing said flowchart symbol extracted by said display cursor control upon editing via said assemble data buffer;

a graphic program assemble code converter connected to said graphic program temporary buffer and said assemble data buffer for converting said flowchart symbol temporarily stored in said graphic program temporary buffer to an assemble code for editing of the flowchart in said code generator and for temporarily storing thereafter said assemble code so converted for later processing; and a code converter connected to said graphic temporary buffer for converting the graphic program information descriptive of the finished flowchart to a predetermined program language for use in external equipment.

2. The flowchart generator of claim 1 further comprising transfer means connected to said code converter for transferring said predetermined program language to external equipment.

3. The flowchart generator of claim 1 further comprising a second code converter connected to said display for converting an external equipment code program supplied from the external equipment to a graphic program for display on said display for monitoring said external equipment.

4. The flowchart generator of claim 1 further comprising a monitor connected to said display for again displaying part of the finished flowchart on said display for monitoring thereof.

* * * * *